Sept. 7, 1943.    I. B. JOHNSON ET AL    2,328,650
FINISHING LINED BRAKE SHOE
Filed Jan. 19, 1940    9 Sheets-Sheet 2

Sept. 7, 1943.   I. B. JOHNSON ET AL   2,328,650
FINISHING LINED BRAKE SHOE
Filed Jan. 19, 1940   9 Sheets-Sheet 6

Inventors:
Irving B. Johnson,
Anthony Arquilla,
by Emery, Booth, Townsend, Miller & Weidner
Attys.

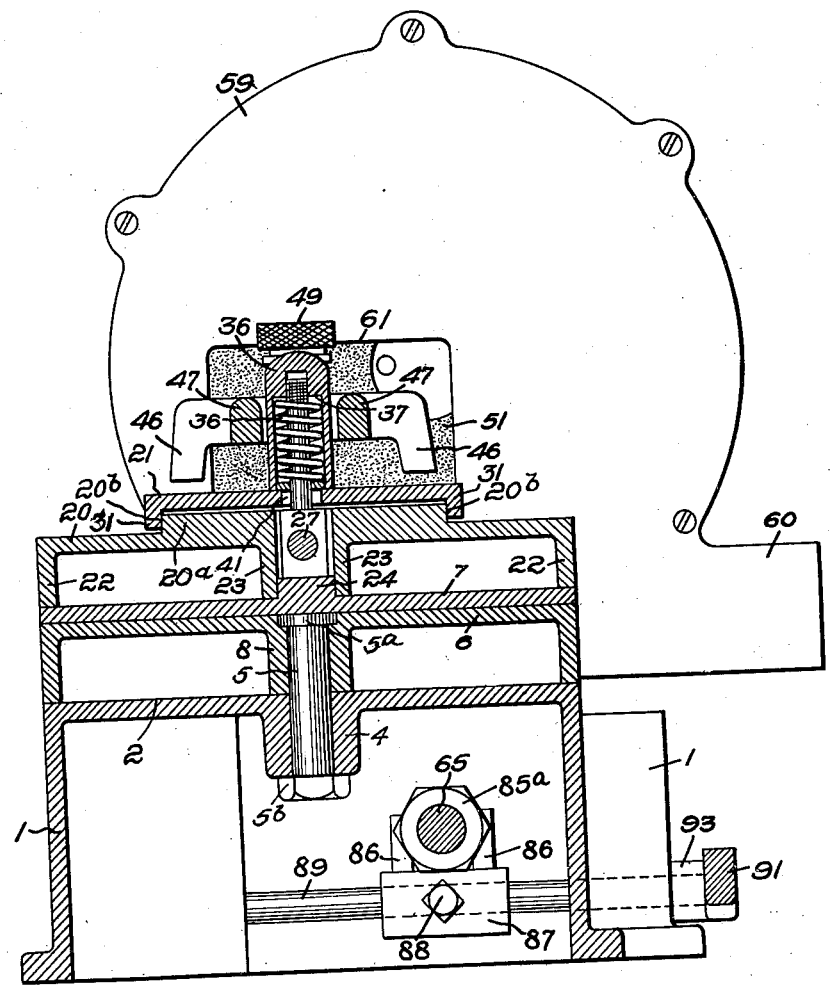

Sept. 7, 1943.      I. B. JOHNSON ET AL      2,328,650
FINISHING LINED BRAKE SHOE
Filed Jan. 19, 1940      9 Sheets-Sheet 8

Inventors:
Irving B. Johnson,
Anthony Arguilla.
by Emery, Booth, Townsend, Miller & Weidner Attys.

Sept. 7, 1943.  I. B. JOHNSON ET AL  2,328,650
FINISHING LINED BRAKE SHOE
Filed Jan. 19, 1940    9 Sheets-Sheet 9
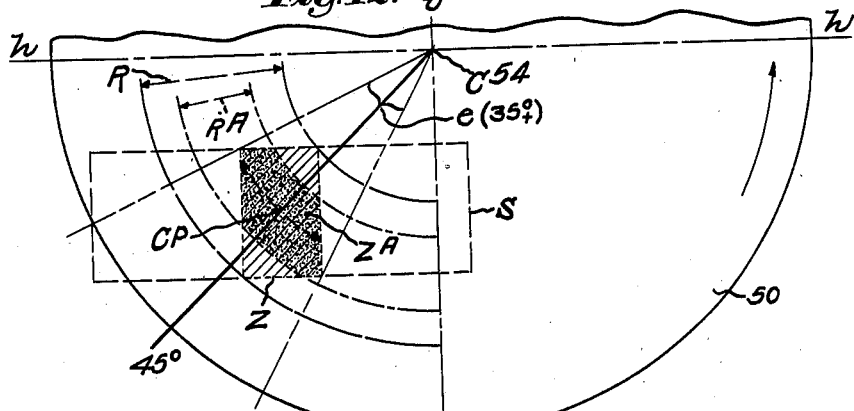
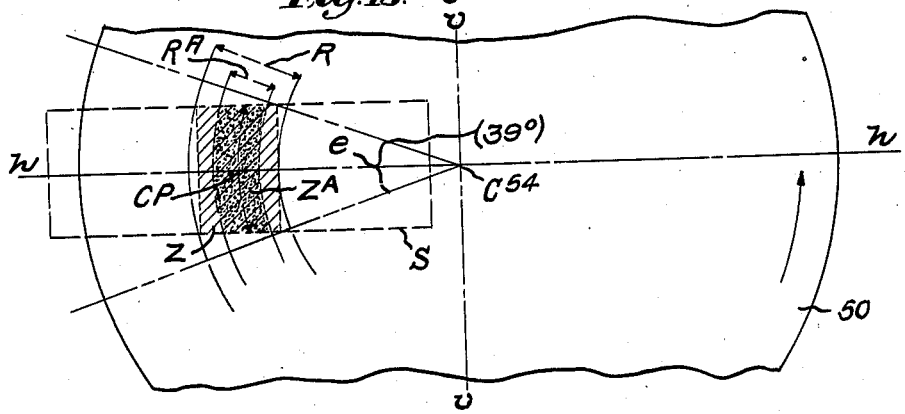
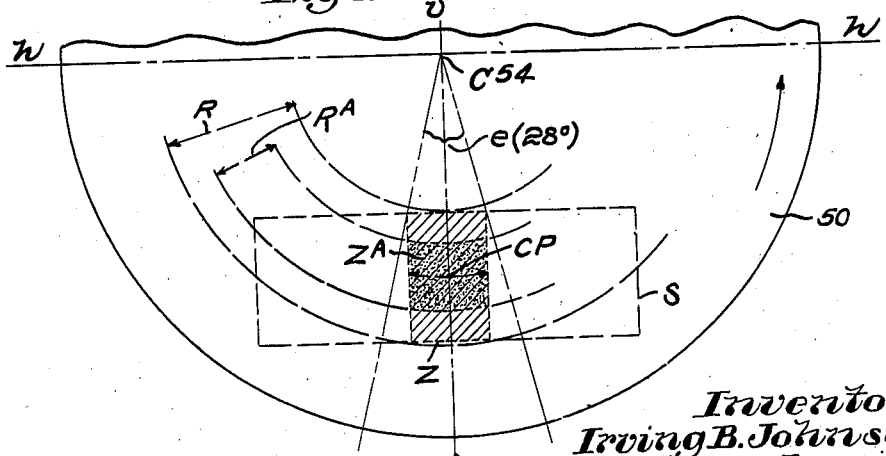

Patented Sept. 7, 1943

2,328,650

UNITED STATES PATENT OFFICE 2,328,650

FINISHING LINED BRAKE SHOE

Irving B. Johnson, Malden, and Anthony Arquilla, Medford, Mass.

Application January 19, 1940, Serial No. 314,584

14 Claims. (Cl. 51—124)

Our present invention is concerned with abrasively treating, burnishing or finishing lined brake shoes, especially the brake shoes of motor vehicles, by properly conditioning the face of the lined or relined shoes with reference to the particular brake assembly in which they are to be incorporated. More particularly the invention aims to provide a simplified method, with novel means for use in the practice of such method, whereby the lining applied to brake shoes may be rapidly finished with extreme accuracy. The apparatus of our invention is simple and rugged in construction, easily adjustable for shoes of different makes and sizes, and is substantially fool-proof in operation. Various other features of improvement both in the method and in the means for the purpose stated will be apparent from the disclosure herein.

Merely by way of further identification of the field of our invention, it is noted that typical prior machines of the relatively small class here concerned are represented in the following United States patents: Simpson, 1,906,201; Dodge, 1,918,020; Fisher, 1,919,545; and Bigelow, 2,118,003. In various respects our present invention improves upon the apparatus and methods of said patents.

In the drawings illustrating by way of example certain embodiments of our invention and whereby the method thereof may be practiced:

Fig. 3a is a partial vertical cross-section as if on the line 3a—3a of Fig. 3;

Figure 1:
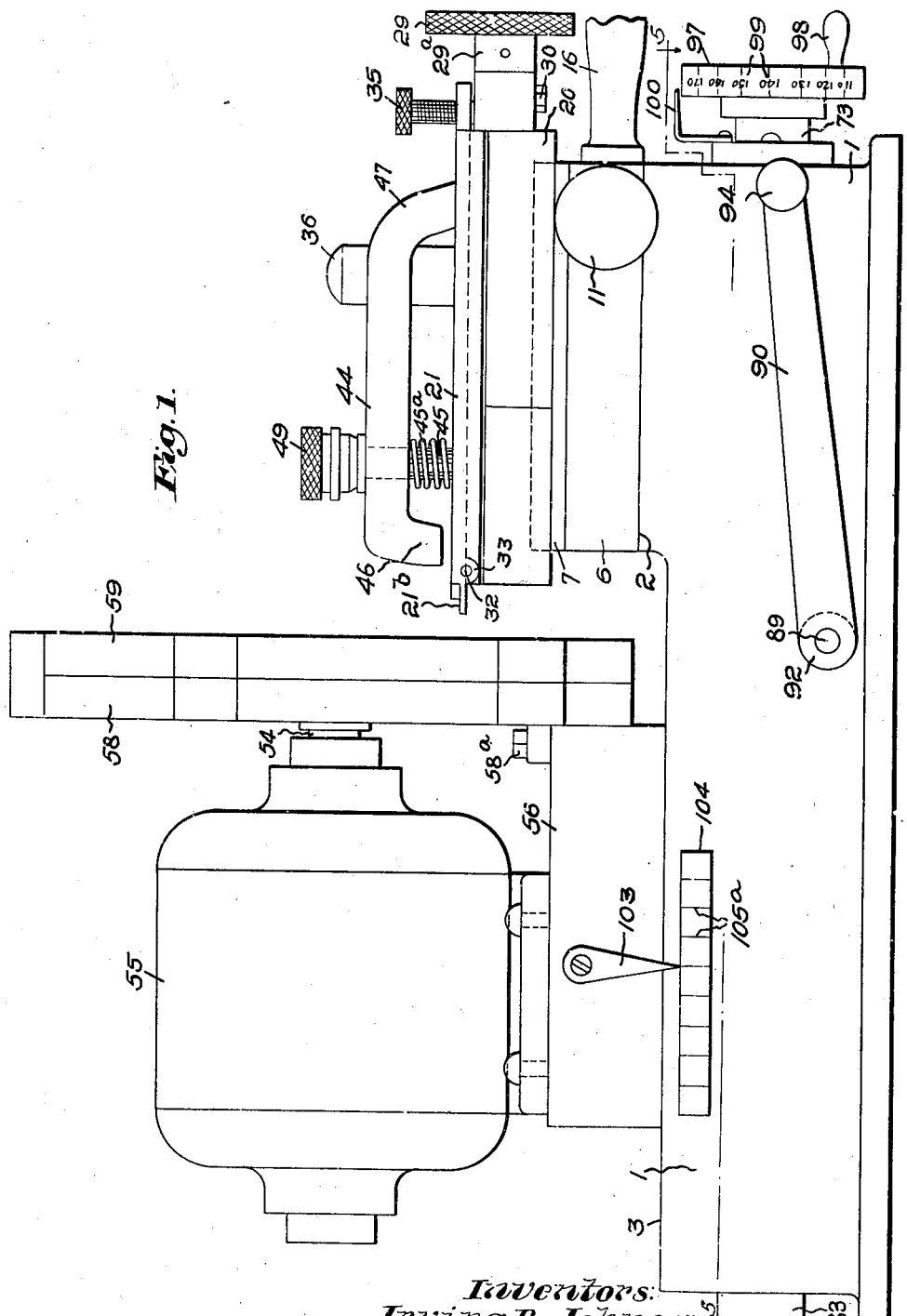
Fig. 1 is a side elevation of one form of the machine as a whole.
Figure 3:
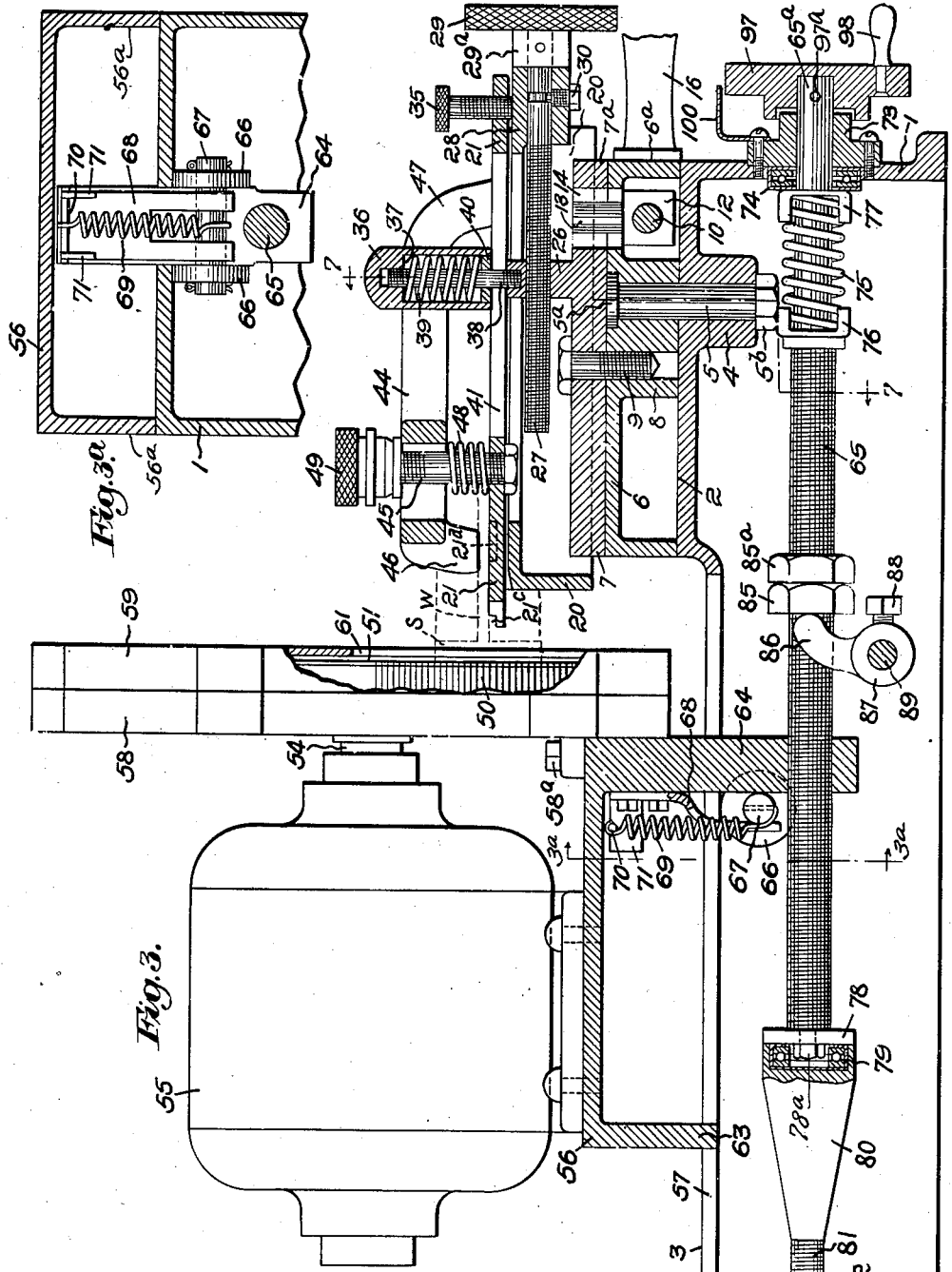
Fig. 3 is a longitudinal vertical section through the machine of Figs. 1 and 2, with the motor and main part of the grinder housing in side elevation.
Figure 4:
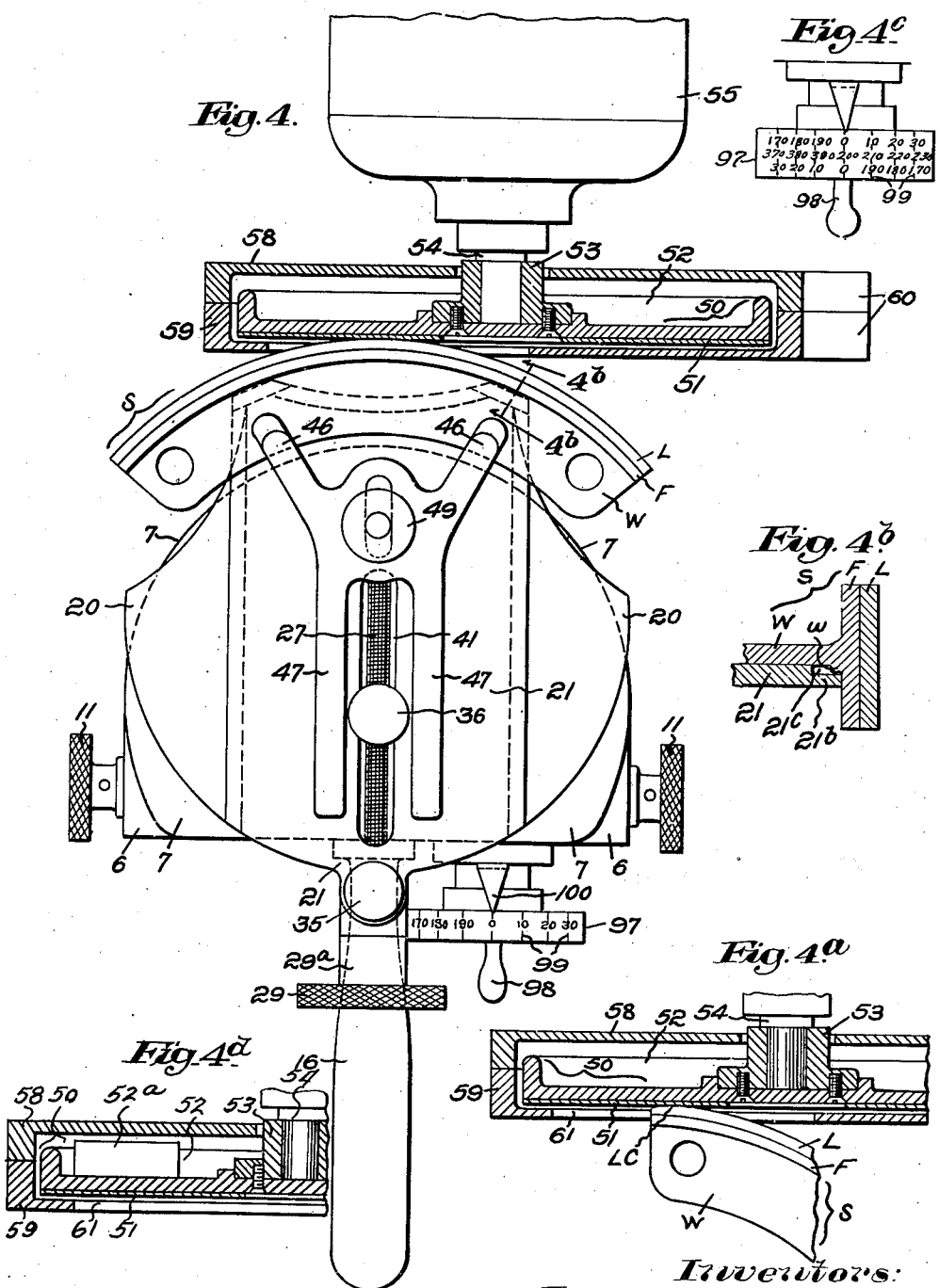
Fig. 4 is a view corresponding to a portion of Fig. 2, with parts in horizontal section and illustrating a specimen of the work, in this instance a lined brake shoe, installed in position to be operated upon.
Figure 5:
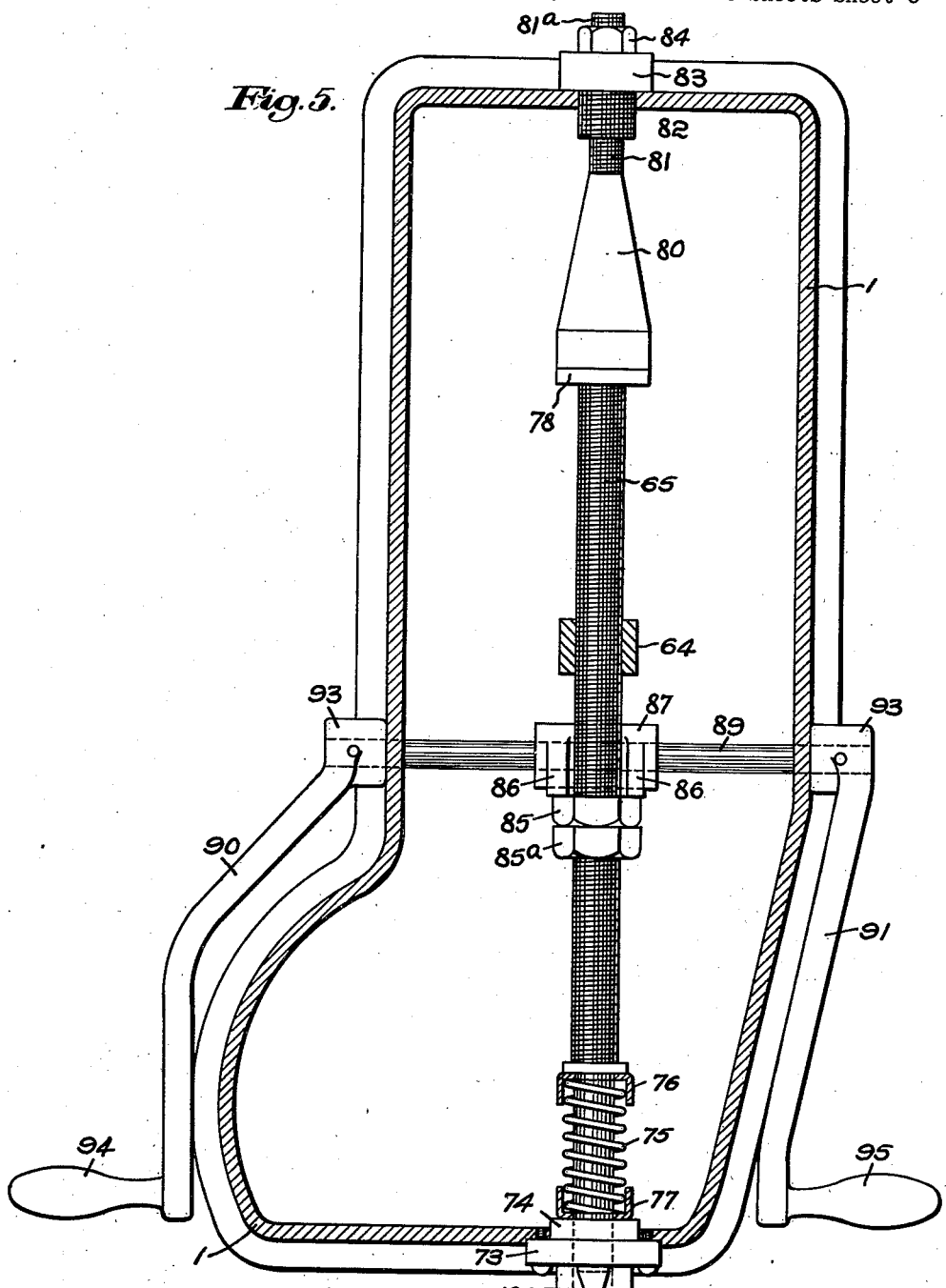
Figure 6:
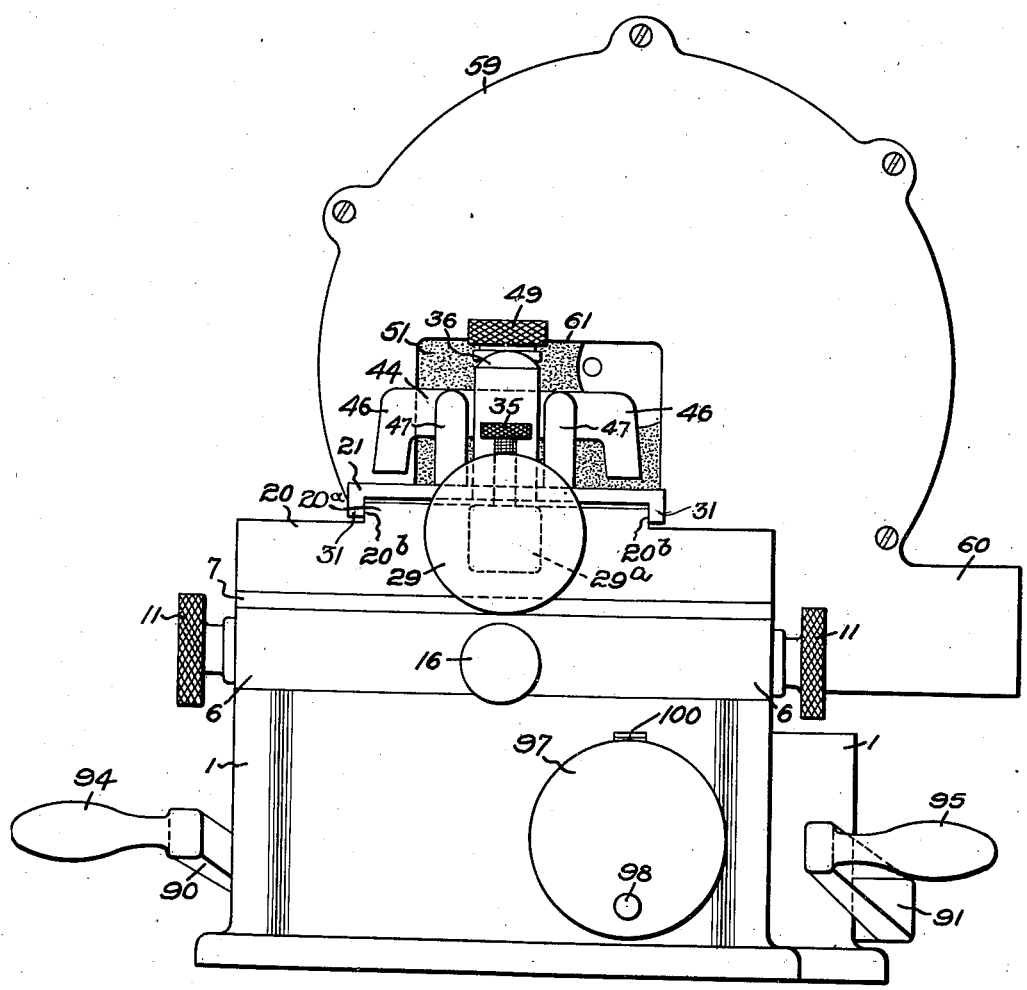
Figure 10:
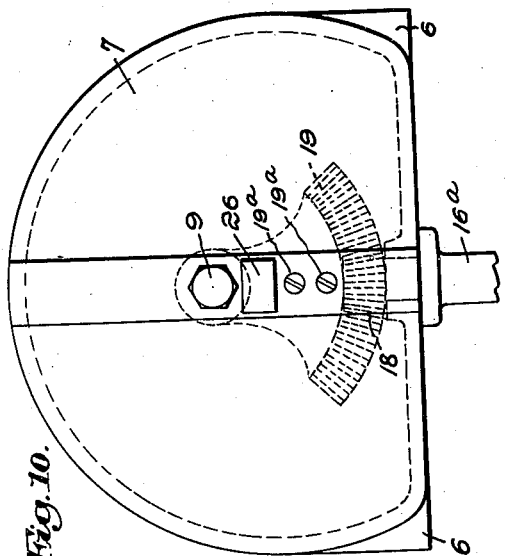
Figure 11:
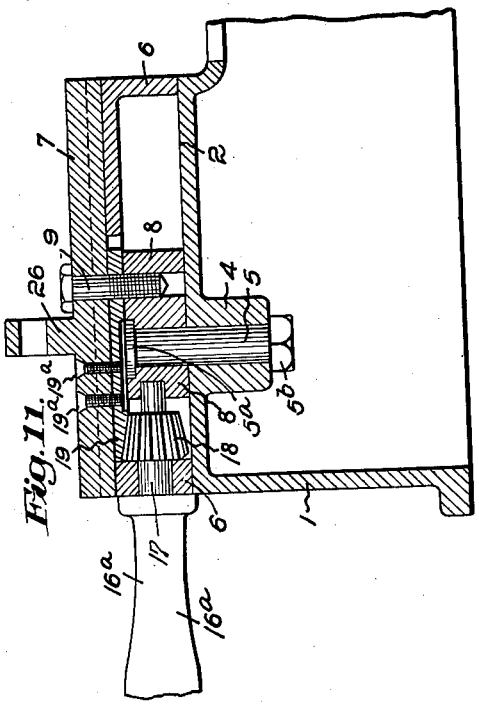
Figure 8:
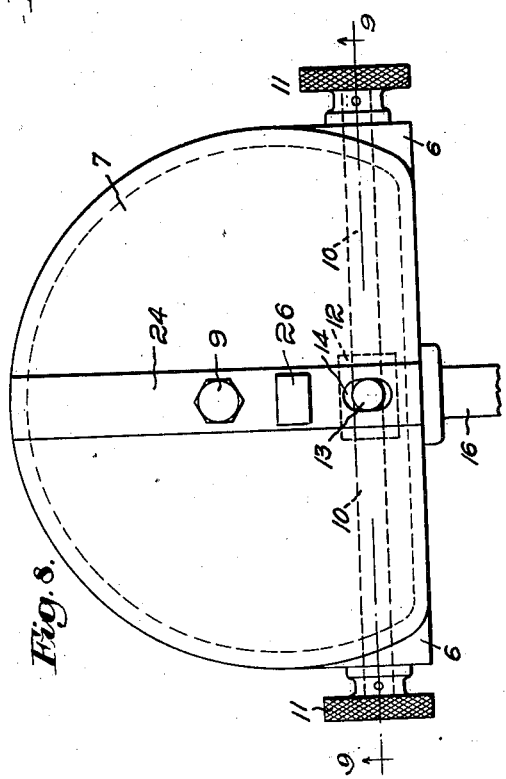
Figure 9:
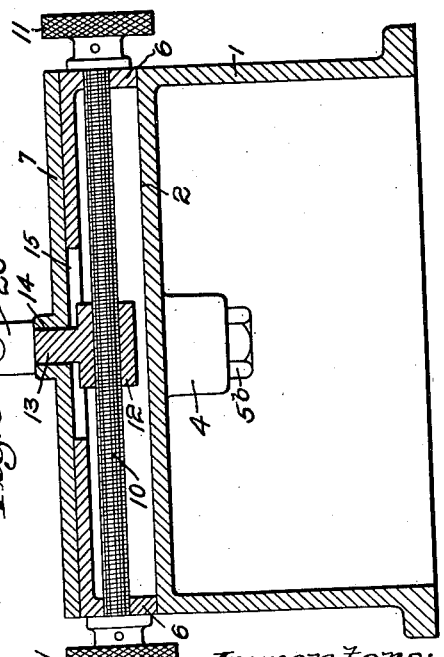

Fig. 4a corresponds to an upper left portion of Fig. 4, illustrating a method of treatment of the end areas of the brake lining;

Fig. 4b is an enlarged section on the line 4b—4b of Fig. 4;

Fig. 4c shows separately one form of a grinder-setting dial;

Fig. 4d is a view similar to Fig. 4a illustrating dust removal vanes in association with the abrading wheel;

Fig. 5 is a horizontal longitudinal section substantially on the line 5—5 of Fig. 1;

Fig. 6 is a front end elevation of the machine as a whole;

Fig. 7 is a vertical cross-section on the line 7—7 of Fig. 3;

Fig. 8 shows in top plan the lateral adjusting principle and associated parts, with overlying elements removed for the sake of clearness;

Fig. 9 is a vertical transverse section on the line 9—9 of Fig. 8;

Figs. 10 and 11 illustrate a different form of lateral adjusting means, Fig. 10 being a view corresponding to Fig. 8 and Fig. 11 a vertical section taken longitudinally instead of transversely as in Fig. 9;

Fig. 12 illustrates diagrammatically the relative positioning of the shoe and the rotary abrasive element in accordance with one feature of the invention; and Figs. 13 and 14 show in a similar manner as in Fig. 12 certain contrasting prior constructions, said Figs. 12 to 14 being a related diagram series portraying the advantages of applicant's novel construction as in Fig. 12 as compared with said Fig. 13 and Fig. 14 constructions.

Referring now to the drawings in more detail, the machine there shown for the purposes of illustration is a compact mechanical unit of simplified and rugged construction and attractive in appearance. It comprises a stationary supporting bed 1, see particularly Figs. 1, 2, 5 and 6, which provides a base for the machine as a whole, adapting the latter to be installed for operation at any convenient location for the work, as on a work bench or on a suitable pedestal, frame or like support.

The bed 1 is shown as an integral casting, open at the bottom and of a general elongated rectangular shape as viewed in plan. The front or forward portion of the bed 1, adjacent the operator, may be offset laterally, Figs. 2, 5 and 6, to provide for a novel offset positioning of the work relative to the axis of the rotary abrasive element, in the manner and for the purpose later to be described. The bed 1 has inclosing side, back and front walls on which is a substantially horizontal floor, including a front or work-supporting portion 2 and a somewhat lower rear floor portion 3. The front floor portion 2 constitutes in effect a table for presenting the work to the abrasive wheel. At its under face is a boss 4 apertured to receive a pivot element or post 5. The location of the latter on and relative to the bed 1 it will be noted is constant. As will more fully appear hereafter, this main pivot position always is the same, irrespective of the size or type of shoe to be finished or the extent to which the lining of any particular shoe is to be ground. Said pivot or post 5 positions the work carrier or work-holding assembly as a whole for lateral swinging movement upon the bed.

Such work unit or carrier herein comprises a two-part base, including lower and upper base plates 6 and 7; see Figs. 3 and 7. These base plates are complemental similarly shaped elements, as viewed in plan, see Figs. 2, 4 and 8, of a general part-circular contour inwardly of their straight front walls 6a, 7a. The lower base plate 6 has a substantially central solid section 8 in the nature of a hub, which is vertically apertured to fit the pivot 5. The latter has a heavy flanged circular head 5a seating in a like recess at the upper face of the lower base plate 6 whereby the work unit as a whole is secured on the bed but with capacity for swinging over it about the vertical axis provided by the pivot post 5. The latter extends below the boss 4 of the bed and is threaded to receive a nut 5b by which the work carrier may be tightened or loosened relative to the bed, to adjust the ease of its swinging movement to suit the particular operator.

Noting particularly Fig. 3, the two parts 6 and 7 of the work-carrier base are arranged for relative transverse adjustment horizontally, to center or present the arcuate shoe to the abrasive element symetrically, regardless of the size or type of the particular shoe. Accordingly the upper base plate 7 in the illustrated example is rotatively movable relative to the under one, about a vertical axis defined by a stud 9 extending freely through the upper base plate 7 and threaded into the solid portion 8 of the lower base plate 6.

Means is herein provided for laterally adjusting, angularly in the present instance, the variably positionable upper member 7 of the carrier base. Referring still to Fig. 3 and also to Figs. 8 and 9, the lower base plate 6 carries a cross rod 10 rotatably received in and extending outwardly through bearing apertures in its opposite side walls; see particularly Fig. 9 in which and also in Fig. 8 the portions of the work-carrier assembly above the base members 6 and 7 have been removed, for clarity in illustration. Knurled thumb nuts or the like 11 fixed on the ends of the rod 10 afford means for turning the latter to effect the relative lateral adjustment of the two base members 6 and 7, from either side of the machine as may be more convenient.

The adjusting rod 10 is threaded at least at its central portion, and there extends through a similarly threaded aperture in a nut or traveller 12. The latter has an integral upright pin 13 slidably received in a longitudinal slot 14 in the upper base plate 7, providing for relative movement between said parts in the longitudinal direction, while the lower base plate 6 is slotted as at 15 to permit lateral traversing movement of the nut 12 and its pin 13. Manipulation of either thumb nut 11 accordingly operates to shift the upper plate 7 of the carrier base on and relatively to the lower base plate 6, herein angularly or rotatively, about the stud 9 as a vertical axis.

The work carrier unit has a convenient hand grip or lever 16, seen in Figs. 1 to 4 and 6, for manually swinging the entire carrier with the shoe mounted thereon across the face of the abrasive element. In the present instance this work-swinging hand lever 16 is conveniently located at the front of the machine facing the operator, being attached to and projecting from the front wall of the under base plate 6. In Figs. 10 and 11 we have shown a modified form of means for laterally adjusting the upper member 7 of the carrier base, in which the adjustment is effected through the medium of the same hand grip 16A which is engaged by the operator in swinging the work.

Referring to said Figs. 10 and 11, the common hand grip or member 16A, for swinging the work carrier and for laterally adjusting the same, has an axial shaft portion 17 at its inner end. This shaft portion extends through and is journaled in the front wall of the lower base plate 6 and also has a bearing in the solid hub portion 8 of the lower base plate 6. On this shaft extension 17 of the hand grip is fixed a bevel pinion 18 meshing with a segmental rack 19 secured as by screws 19a to the under face of the upper base plate 7. Thus by turning the hand grip 16A on its own longitudinal axis in one or the opposite direction the upper plate 7 of the carrier base will be correspondingly moved angularly relative to the lower base plate 6; again in this instance rotatively about the stud 9 as a vertical axis, similarly as described in connection with Figs. 3, 8 and 9.

Referring again to Figs. 1 to 4, 6 and 7, the work carrier unit or assembly further comprises an upper element or head constituting the holder proper. This head is in the form of a two-part supporting element including a main plate 20 mounted on the carrier base 6—7 and a top plate 21 on which the work is directly received.

Figure 2:
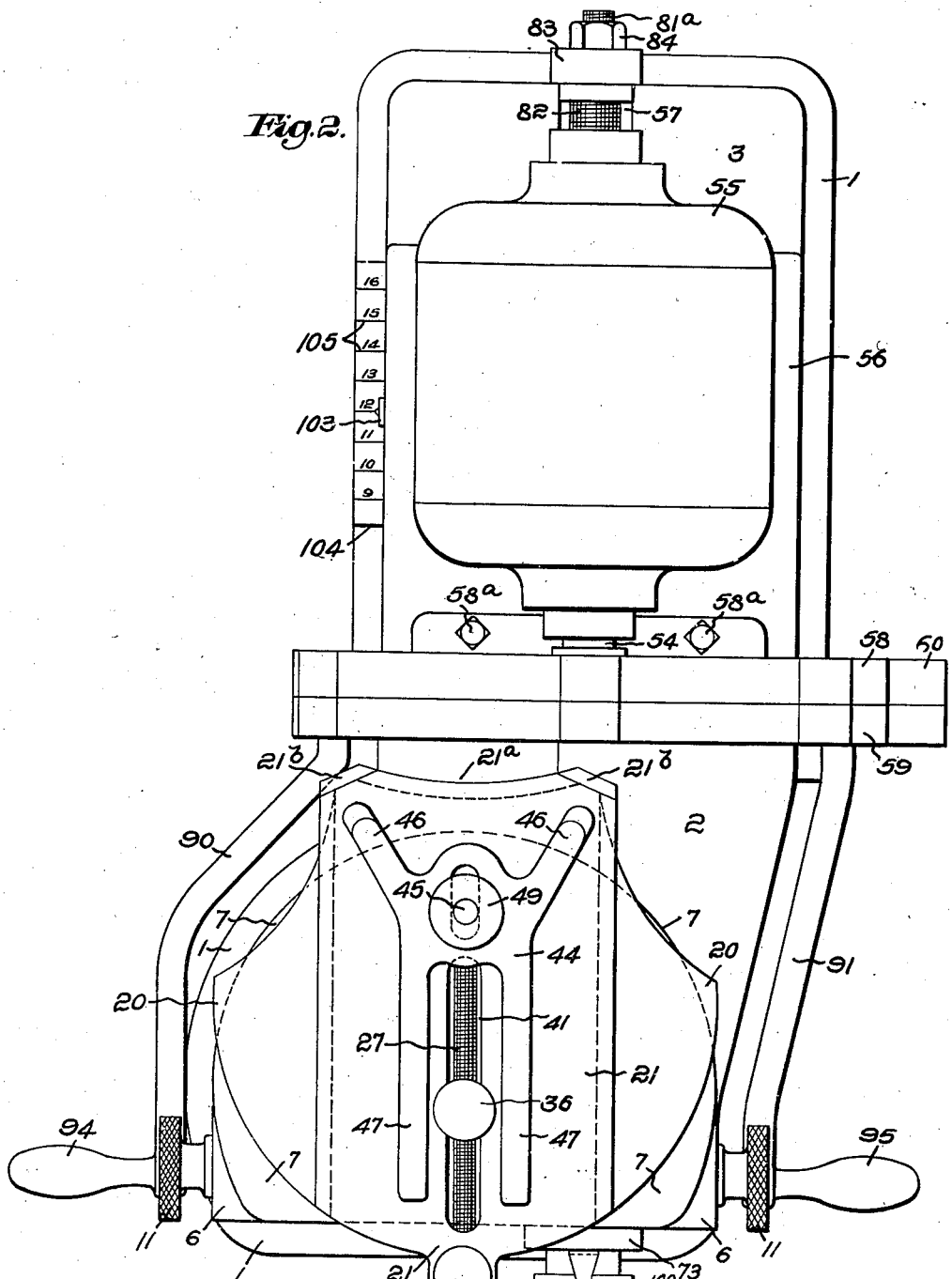
Fig. 2 is a top plan of the machine of Fig. 1.

Said head plate 20 as viewed in plan is shaped substantially as seen in Figs. 2 and 4, having a general semi-circular contour at its front portion and symmetrically narrowing inwardly thereof. It has upright side walls 22 below its plate portion, whereby, in part, it is supported flatwise on the upper plate 7 of the carrier base.

The entire head, including the plate members 20 and 21 and the parts carried by them, is movable lengthwise the machine, upon and relatively to the carrier base 6—7, for feeding or presenting the arcuate face of the shoe in abrading contact with the abrasive member in the course of a finishing operation. Accordingly the head plate 20 has centrally disposed at its under face spaced upright parallel guide flanges 23, extending diametrally of the carrier pivot 5, when the base plates 6 and 7 are in registry, as best seen in Fig. 7. Said flanges receive between them a central longitudinal guide rib 24 on the top face of the upper base plate 7; see also Figs. 8 and 9.

The carrier head is adapted to be advanced toward and retracted from the face of the abrasive element (to be described), to give a convenient clearance for inserting and removing the shoe and for feeding it against the abrasive wheel during a finishing operation. Suitable means is herein provided for so moving the carrier head, slidably along the rib 24 as a guide. Noting particularly Fig. 3, the upper plate 7 of the carrier base is formed with an upright projection or lug 26 apertured and threaded to receive a screw stud 27. At its outer front portion said screw stud has bearing support in a sleeve 28 at the front of the lower head plate 20 and has a hand wheel or knob 29 fixed on its projecting end. The screw stud 27 is held longitudinally relative to the lower head plate 20, by abutment of the collar portion 29a of said manipulating wheel 29 against the sleeve 28 and additionally as by a stop pin or the like 30 on the sleeve 28 and projecting freely into an annular groove on the screw stud 27 at its non-threaded portion within the sleeve bearing 28.

Thus by turning the wheel 29 in one or the opposite direction the work-holding head of the carrier is moved on and relative to the carrier base, for the purposes above mentioned, by reason of the threaded engagement of the screw stud 27 with the lug 26 fast on said base.

A typical specimen of the workpiece for which our machine and method are particularly adapted, namely a lined arcuate brake shoe for the internal-expanding type of brake, is seen in Figs. 4 and 4a and in section in Fig. 4b. Such shoe, indicated as a whole by the letter S comprises a main arcuate flange F and a radial attaching and reenforcing web W. The flange F perpendicular to the web W has attached at its outer convex face the lining L which is to engage directly against the inner face of the corresponding brake drum. For the most efficient action that contact should be uniform over the entire face of the lining. To insure such lining-to-drum contact throughout, the lined shoe face must be precision finished evenly over its entire area to within a few thousandths of an inch of true arcuate conformity with its drum. It is a main object of our invention to make possible such precision finish by positioning the shoe relative to the abrading element with extreme accuracy but in such simple fashion, universally applicable to any size of shoe, that the opportunity for error by the workman is substantially eliminated.

Accordingly as an important feature of our invention, the brake shoe to be finished is mounted and held by direct flatwise supporting and clamping engagement with the faces of its radial web W. At the same time the shoe is accurately and uniformly positioned by abutting engagement of positioning means at the inner face of its flange F. Substantially any size and make of shoe, within the capacity of the given machine, is thus readily mounted in one and the same manner, without reference to the location of the bolt-holes in the web or end of the particular shoe and regardless of the overall length of the web or its individual construction. Among other advantages this avoids having to furnish special templets, spacers and filler blocks, rests and the like for each differing shoe, all of which attachments required time-consuming selection and careful installation by screws, anchor members, end positioners and such, as a preliminary to the given job. The supplying of extensive and involved data as to the particular parts and accessories for so setting up the machine for different jobs is thus dispensed with, since the work-holding means of our machine needs no special set-up for practically any present-day standard brake shoe equipment of the various popular makes of automobiles.

With these advantages in view, and referring again to Figs. 2 to 4 and 4b, the shoe is set horizontally on its radial web W, with the main central section of said web, usually for at least a third of the lined length of the shoe, resting flatwise directly upon the flat top face of the inner portion of the upper head plate or holder plate proper 21, previously mentioned. This holder plate 21 is of a general rectangular form as viewed in plan; Figs. 2 and 4. At its opposite sides are downturned flanges 31, Figs. 6 and 7, receiving between them the central longitudinal high portion or step 20a of the lower head plate 20. The side walls 20b of said step 20a position the holder plate 21 laterally and guide it for vertical adjustment.

Such adjustment is found desirable in connection with certain types of shoes, to true them to the working face of the abrasive wheel. For this purpose the holder plate 21 is herein horizontally pivoted at the inner end of the under head plate 20 as by means of pivot pins 32 at the sides of the step 20a of the latter, see Fig. 1, said pins received in lateral bosses 33 on the holder plate 21. An adjusting thumb screw 35 is threaded through an aperture near the outer or front end of the holder plate 21, with its lower end engaging the flattened top face of the sleeve 28 or under head plate 20. Turning of the adjusting element or jack screw 35 in one or the opposite directions accordingly raises or lowers the outer portion of the holder plate 21, with resultant opposite lowering or raising of its front end, on the horizontal axis provided by the pivot pins 32.

The holder plate 21 is further secured in the selected position of vertical adjustment as by means of a tubular clamping nut 36, see particularly Figs. 3 and 7 and also Figs. 1 and 6. The end wall of the nut 36, above its tubular bore 37 is vertically recessed and threaded to receive the upper end of a correspondingly threaded post 38 fixed in and projecting upwardly from the lug 26 on the upper base plate 7. A coil spring 39 surrounding the post 38 within the nut 36 bears between the end wall of the latter and a disk 40 at the base of the nut and through which the post extends loosely. The holder plate 21 is longitudinally slotted as indicated at 41, Figs. 2, 3 and 4, for passage of the post 38, so as to permit the previously described longitudinal movement of the carrier head as a whole on and relative to the carrier base 6—7. The nut 36 straddles the slot 41, bearing on the holder plate 21 at both sides of said slot, and thereby firmly but yieldably holding down the carrier head against its longitudinally fixed base portion 6—7. By turning the nut 36 the spring pressure may be adjusted to take up any play between the base and head portions of the carrier, but still permitting the carrier head to be advanced inwardly and retracted by means of the finger wheel 29, without each time necessitating manipulation of said nut. The pitch of the feeding and retracting screw 27 is so selected as readily to afford a smooth regular motion of the carrier head under its adjustable loading by the spring 39.

As stated, the lined shoe to be finished is positioned flatwise upon its radial web W. Its then vertical arcuate flange F is firmly abutted, at its portion then below the web W, against positioning means at the inner end of the holder plate 21. As best seen in Figs. 2 and 4 said holder projects inwardly beyond the under head plate 20. Its inner shoe-receiving end is recessed, as indicated at 21a, providing the spaced abutments or positioning stops 21b. These shoe positioners 21b are oppositely angularly disposed symmetrically, one at each side of the longitudinal center line of the holder plate 21.

The inner and outer corners of the two stops are calculated to lie on the circumference line of the inner face of the flange F of the medium size of shoe for which the particular machine is designed, for example, a 12″ shoe, that is, a shoe for a drum of twelve inch internal diameter. Then that particular size of shoe will be positioned on the holder by abutment of its flange F against both corner portions of each stop 21b.

The larger sizes of shoes, say up to 16" or 18" size, having their flanges F formed on a corresponding flatter arc, will be similarly positioned by abutment of the flanges against the inner portions of the two stops 21b, while the smaller sized shoes, down to say 8" or 9" have positioning abutment of the flanges F against the outer portions of said stops 21b. Thus the holder is universally adapted for any size of shoe within the designed capacity of the given machine.

It is obvious that the smaller shoes, having a greater curvature over the chordal distance represented by the lateral distance between the two stops 21b will project inwardly beyond the holder plate 21 somewhat further than the larger shoes, of flatter curvature. But this is wholly immaterial, under our invention, since each and every shoe is always swung, in grinding, about one and the same fixed axis 5, while the radius of grind in each case is set to that of the drum of the given shoe, by moving the rotary abrasive element relative to the fixed axis of swing and setting it at the predetermined radial distance from the latter appropriate for that shoe, as will later be more fully described.

We emphasize here, however, that shoe positioning means of the simplicity and ease of manipulation such as had with the disclosed construction, universally applicable to the various shoe sizes, is largely possible only because the axis of swing for the shoe is constant and the radius of finish is set by adjusting the abrasive wheel toward and from that axis and then feeding and swinging the shoe against the wheel. Otherwise, if the axis of swing were to be shifted, for example as in the machine of the Bigelow patent referred to, some complicated and proportionate adjustment for practically every different shoe would be necessary, due to the different curvature and resulting slightly different inward projection of the different shoes relative to our universal holding device, if a minimum and uniform thickness of the lining is to be removed in each case. In other words, in accordance with our invention, the distance from the axis of swing 5 to the outer face of the shoe before grinding, also the relation of the center of the shoe itself to the axis of swing, are immaterial, to the extent indicated, and are not relied on in measuring and setting the machine for the desired radius for the finished face of the shoe. Instead, the grinding wheel is set to operate in a plane spaced from the fixed axis of swing by exactly the measurement desired for the radius of the finished shoe, namely, the radius of its drum. If a shoe for a drum one inch greater or one inch less in radius is to be finished, then the wheel is set back from or advanced toward the fixed axis of swing by exactly one inch, and not some proportionately reduced or augmented distance less or greater than one inch in order to compensate for the different degree of curvature and control projection of the larger or smaller shoe.

In placing a shoe in the machine the operator merely sets it approximately centrally on the holder plate, laying the radial shoe web W flatwise on the inner end of the latter and firmly abutting the vertical shoe flange F against the stop elements 21b. Accurate centering of the shoe, laterally of the holder, is subsequently had, by turning one or the other of the lateral adjusting knobs or buttons 11 previously described, or in the construction of Figs. 10 and 11 by axially rotating the handle 16, whereby the upper plate 7 of the carrier base and all parts above it are bodily adjusted horizontally relative to the pivotally fixed under base plate 6.

As best seen in Figs. 3, 4 and 4a, the shoe positioning abutments 21b of the holder plate desirably also are formed at their flange-engaging portions with a recess 21c, at the upper corner regions, in the vicinity of the juncture of the radial web W of a shoe with its perpendicular arcuate flange F. This recessed formation accommodates the reenforcing enlargement or possible irregular projections sometimes present at that part of a shoe, as indicated at w in Fig. 4b. Thus the inner concave face of the vertical shoe flange F is permitted to be brought into intimate abutting engagement with the stops 21b. In some older types of shoes their radial webs may have a rib or other projection on their flat faces, such for example as the stamped out portion 44 on the web of the shoe of the Maynard Patent No. 1,764,847, a former Chrysler shoe. To accommodate such now unusual formations the holder plate 21 may be appropriately recessed at its upper face as indicated in dotted line at 21d in Fig. 3. For the rare case of a shoe web construction not thus accommodated, the holder plate 21, being readily removable, may be replaced by a like plate specially formed for the purpose, or an adapter block conforming to the particular special shoe web may be set flatwise on the holder plate of the present figures.

The shoe to be finished is securely held in the described operative position on the holder plate 21 of the carrier head, by means of an easily applied holddown or clamping device, Figs. 1 to 4, 6 and 7. Said means here comprises a unitary clamp 44 in the form of a spider or yoke. It includes a main or body portion vertically slotted for the passage of an upright stud 45 anchored on the holder plate 21. At its inner end the clamp 44 has a pair of divergent and downwardly projecting feet 46 adapted to engage the upper face of the radial web W of a positioned shoe, preferably adjacent the corresponding positioning stops 21b of the holder plate. The clamp 44 further includes a pair of outwardly extending legs 47, spaced to straddle the holddown nut 36 previously described and downturned at their outer ends to stand flatwise on the top face of the holder plate 21.

By turning down a clamp nut 49 on the threaded upper end of the stud 45, the clamp is forced down onto the shoe web and the holder plate. Thus the shoe is firmly clamped and held in operative position, from which it may be quickly released on completion of a finishing operation, merely by loosening said nut 49. A coil spring 48 surrounding the stud 45 below the clamp 44 automatically lifts the inner shoe-engaging end of the clamp as the nut 49 is backed off, thus in effect automatically opening the jaw of the clamp and facilitating the insertion and removal of the shoes, while also guiding the clamp and holding it against undesired displacement relative to the other parts when no shoe is in position.

The mechanism thus far described comprises the work positioning and manipulating means, whereby the arcuate lined shoes are presented for horizontal swinging about the fixed axis 5 on the machine bed. We turn now to the abrading or grinding assembly, including the motor-driven grinder wheel or abrasive element together with the means whereby in cooperation with said fixed pivot 5 the radius to which the shoe is to be ground is accurately predetermined and set in conformity with the brake drum for which the particular shoe is intended. In accordance with our invention this setting of the radius of grind, that is, the radius for the finished outer face of the shoe lining, is readily effected with extreme accuracy by adjusting the position of the working face of the abrasive element relative to the invariable position of the work-carrier axis 5 on the machine bed.

The abrasive element, disk or wheel is indicated as a whole by the numeral 50; Figs. 3 and 4. It comprises an abrading element proper 51, usually of a rather fine abrasive material, replaceably or otherwise secured to a backing plate or wheel 52. The latter in turn is attached as by screws to a hub 53 fast on the shaft 54 of the electric motor 55. The motor 55 is demountably secured on a base or slide 56 mounted on the rear portion of the machine bed 1 and movable forwardly and rearwardly thereon. The slide is guided for said movement by a slotted way 57 in the top wall of the bed 1.

The abrasive element 50 has a housing comprising a back plate 58 attached to said base slide 56 as by the bolts 58a, Figs. 2 and 3, and a detachable flanged front or cover plate 59 secured to the back plate 58 as by the series of screws around their edge portions, as seen in Figs. 6 and 7.

The illustrated machine is constructed and arranged for rotation of the abrasive wheel 50 in the counter-clockwise direction, looking from the front of the machine toward the working face of the wheel 50, as in said Figs. 6 and 7. The work dust is collected in the wheel housing and is driven or carried off, herein at the base of the housing. The latter accordingly is formed with a dust discharge outlet 60, at its right side, again as viewed in Figs. 6 and 7, in position to receive the dust from the counter-clockwise rotating wheel. As will be more fully explained, the action of the wheel itself, due largely to the relative position of the shoe and wheel, is adequate to expel the dust without the aid of blower or suction means.

The front or cover plate 59 of the housing is apertured at 61, Figs. 3, 4, 6 and 7, opposite the shoe position, for presenting the arcuate lined face of the shoe to the wheel 50 and for swinging it across the latter about the fixed axis 5 of the carrier. It is here particularly noted that the region of contact of the shoe with the abrasive wheel 50 is laterally offset from the wheel axis. In other words, the axis of swing for the shoe, as defined by the fixed pivot 5, is to one side, herein to the left, of the vertical plane through the wheel axis. Further, the work carrier and holding means are so constructed and arranged relative to the grinder unit that the horizontal plane of a supported shoe is vertically offset with respect to the horizontal plane through the wheel axis. In the illustrated instance the shoe is presented to the wheel below the horizontal axis of the latter, substantially midway vertically between the level of the wheel axis and the bottom edge of the wheel. Thus the wheel and the shoe are so relatively disposed that the zone of abrading contact with the shoe is upon a 45° radius of the wheel, that is, approximately midway between its horizontal and the vertical diameters. In the machine shown this radial position is that substantially half-way between the 6 o'clock and 9 o'clock positions on the wheel, as viewed in Figs. 6 and 7, or in other words along the central radius of its lower left quadrant. The purpose and advantages of this construction will be more fully pointed out in connection with the diagrammatic Figs. 12 to 14.

The supporting base or slide 56 for the rotary grinder unit is in the form of an inverted hollow block or plate with supporting side walls 56a, 56a received on the machine bed 1; see particularly Fig. 3a. Its rear wall has a depending guide foot 63 slidably received in the slot 57 of the bed 1 while at its front portion is a further guiding element or leg 64 extending down through said slot 57 and providing the connection between the grinder unit base and the means for slidably moving it along the bed 1. Said means includes a longitudinal screw shaft 65 housed in the bed and extending through a threaded aperture at the lower end of said connecting grinder leg 64. By turning this screw shaft 65 in one or the opposite direction the rotary abrasive unit as a whole is proportionately advanced or retracted relative to the fixed axis of swing of the work carrier, for initially setting the radius to which the particular shoe is to be finished.

Said abrasive unit including its base 56, motor 55 and enclosed wheel 50 is yieldably held down on the machine bed by means such as best seen in Figs. 3 and 3a. For this purpose we have provided a pair of rollers 66 rotatable on a cross shaft 67 so as to run on and bear yieldably up against the under face of the horizontal top wall 3 of the machine bed 1, one roller 66 at each side of the guide slot 57. The roller shaft 67 is vertically movably held between the leg 64 and the forked lower end of a spring plate 68 screwed or otherwise secured to the upper portion of said leg 64. It is vertically supported by a coil spring 69 having its lower end anchored in the roller shaft and fastened at its upper end to a pin 70 held in a pair of ears 71 at the upper portion of said plate 68. The tension of the spring 69 is made sufficient to keep the motor and abrasive wheel unit at all times firmly but yieldably seated on the machine bed 1, while freely permitting them to be adjusted along it to a setting to afford the proper finished radius for any given shoe.

The adjusting screw shaft 65 has a non-threaded front end portion 65a extending loosely through a sleeve 73 set in an opening in the front wall of the machine bed 1 and fixed to the latter, said sleeve carrying a ball thrust bearing 74 rotatably supporting the screw shaft 65 with capacity for bodily movement axially at the will of the operator, for a purpose to be described. This screw shaft 65 is yieldably held in its normal rear position as seen in Fig. 3 by means of a strong surrounding coil spring 75 bearing between collars 76 and 77 on the shaft 65. At its rear end it has an abutment element 78 shown as a separate disk or plate fixed on the shaft 65 as by a nut 78a, said element 78 normally taking against the face of one part of a ball thrust bearing 79 at the inner end of a supporting block or hanger 80. The outer end 81 of the latter is of reduced diameter and is threaded through an externally threaded collar 82 in the rear wall of the machine bed, said collar having a head 83 outside the bed. The projecting outer end 81a of the bearing block 80 receives a lock nut 84. Thus the position of the bearing block 80 is readily adjustable lengthwise the machine, for resetting the normal or zero position of the screw shaft 65 whenever desired, for example to compensate for wear at the face of the abrading disk 50.

It is desirable in finishing a brake shoe to skive or chamfer the lining at its ends, beveling them substantially as illustrated in Fig. 4a. While this may be accomplished by manipulation of the carrier feed screw, it is preferable not to disturb the carriage setting and also to provide for a more rapid and positive skiving action. It is for this purpose that the adjusting screw shaft 65 of the grinder wheel unit is constructed and arranged in the described manner, with capacity for bodily movement axially. Such movement, it will be understood, effects a corresponding movement of the grinder unit, to skive the shoe ends.

Means quickly and conveniently available to the operator is provided for so moving the screw shaft 65 and the grinder unit with it, forwardly, with automatic return. Herein for the purpose there is adjustably threaded on the screw shaft 65 an abutment nut 85 and an associated lock nut 85a. Behind and in camming engagement with the abutment nut 85 is a pair of cam fingers 86, one at each side of the screw shaft 65. These fingers 86 are carried by a sleeve 87 adjustably fixed as by set screw 88 on a transverse rock shaft 89 journaled in the side walls of the machine bed and projecting outwardly through them. At each projecting end of this rock shaft 89, is an operating lever 90 and 91. These extend forwardly along and in general conformity with the sides of the machine base 1 and have collars 92 and 93 respectively at their rear ends for fixing them upon the corresponding ends of the rock shaft 89. At their outer or front ends the operating levers 90 and 91 are respectively provided with hand grips 94 and 95, one conveniently accessible to the operator at either side of the machine, irrespective of the operator's position and permitting him to use either hand he may prefer. If desired other or supplemental control for the skiving operation may be provided, and in this connection it will be understood that the terms "manual" or "hand" with reference to the skiving control means, illustrated by the operating levers 90, 91, are used in their broad sense to include any form of actuation by or at the will of the operator, whether the operating part is engaged by his hand or is otherwise operated by him or at his election.

It will be understood from the foregoing that in order to skive the shoe lining ends, either before or after finishing the main face of the shoe, the handle 16 of the shoe carriage is moved to one side or the other, swinging the shoe so as to position one end opposite the abrasive wheel 50. The handle of one or the other of the operating levers 90, 91 is then depressed for the brief period required to force and hold the wheel 50 against the shoe end sufficiently to afford the bevel grind. It will be noted that the operating levers 90 and 91 are of substantial length, much greater than that of the cam fingers 86. Thus a powerful leverage is afforded, necessitating but a comparatively slight down pressure on a lever handle 94 or 95, and through a short distance only, in order to shift the screw shaft 65 and its connected grinder unit forwardly in the manner described. Upon subsequent release of the chamfering lever the heavy coil spring 75 automatically returns the parts to their normal rear positions, wholly without effort by the operator.

On the projecting front end of the screw shaft 65 there is fixed a setting dial or wheel 97 having a crank handle 98 for rapid turning of the shaft to provide an initial setting of the abrasive wheel 50. The peripheral face of said dial wheel 97 carries a micrometer setting scale 99 herein extending completely around the dial wheel 97. The graduation units may be of any desired fineness of spacing, for example from 0 to 200 in equal units. This scale is read opposite a stationary pointer or index 100 mounted on a convenient fixed part, herein the shaft sleeve 73.

In setting the machine for any given size of shoe within its capacity, the abrasive unit including the wheel 50 is moved to the proper location on the bed 1 to give the desired radius of grind, that is, to space the working face of the wheel 50 at a distance from the fixed axis 5 of the carrier unit equal to the radius of the brake drum for that shoe, including any deviation from standard found in the particular drum. The standard drum sizes, in diameters, may be determined from schedules available to the operator. But in the case of a drum which has seen considerable service, or preferably in any case, the internal diameter of the drum will be determined by actual measurement.

Referring to Figs. 1 and 2, the sliding base 56 of the abrasive unit has at one side, herein the left, a pointer or index 103 cooperating with an index member 104 upon the machine bed 1. This member 104 carries on its top face a scale 105 facing upwardly and hence easily read from the operator's usual place at the front of the machine. If desired the scale graduations may also be applied at the adjacent vertical face of the index member 104, as at 105a, in Fig. 1.

Said scale 105 is calibrated to read directly in drum diameters, from 9 inches to 16 inches as illustrated, with subdivisions if desired. Thus, for example, in the case of a shoe for a 10-inch drum (diametral dimension) the pointer 103 will be set opposite the mark "10" on the scale 105. This automatically sets the wheel 50 for the corresponding radial distance, here 5 inches, from the fixed axis of swing 5, thereby relieving the operator from mentally figuring the radial measurement from that of the drum diameter. While that is a simple calculation, mistakes are less likely if the need for it is eliminated.

As illustrated in Figs. 1 and 2 the abrasive wheel 50 and its slide are set for a shoe of exactly 12-inch drum size. Having determined this size, either from the manufacturer's chart but preferably by actual measurement, the setting is made by means of the setting dial or wheel 97 at the front of the machine, its crank handle 98 being turned in one or the other direction to advance or to move back the pointer 103 to the "12 inch" mark of the scale 105. Close final adjustment is made by turning the dial wheel 97, either by its handle 98 or by directly grasping the wheel 97 itself, to bring the zero mark of its micrometer scale 99 accurately opposite the pointer 100.

This dial scale 99 is made to read directly in thousandths of an inch of drum diameter measurement, again avoiding necessity for any mental calculation on the operator's part. The circumference of the dial wheel of the illustrated embodiment has twenty main units or divisions, each representing .010 of an inch and serially marked 10, 20, 30, etc. up to 190 from zero, which point also is equivalent to 200 after one full turn of the dial. These main graduations of ten one-thousandths of an inch may be subdivided into individual thousandths.

Turning the dial wheel 97 one main unit of its dial 99, say from 0 to 10, varies the grinder setting through .010 of an inch of drum diameter measurement, actually moving the grinder slide one-half that distance or .005 of an inch. One complete dial wheel turn hence is arranged to give a travel of twenty times .005 of an inch or .100 of an inch for the grinder slide. Thus five turns of the dial wheel and its shaft 65 produce a traversing movement of .500 of an inch (one-half inch), corresponding to a drum diameter measurement of one inch, and corresponding also to one unit upon the main scale 105. In other words, the slide pointer 103 is moved on its scale 105 through one main graduation, say from the 9-inch mark to the 10-inch mark, in five turns of the crank handle 98. The screw shaft 65 is threaded accordingly, providing it with a .1-inch lead. Again, five complete turns of the dial micrometer scale 99 are equal to one graduation of the main scale 105, and hence each of the twenty units of the micrometer scale 99 is equal to one-twentieth of one-fifth of a main scale graduation, that is, one one-hundredth of the latter or .010 of an inch of drum diameter movement, but giving an actual movement of the grinder slide of one-half that amount or .005 of an inch.

Assume now that a "12-inch" brake drum is found by measurement to be oversize, say 12.180 inches in diameter, perhaps having been returned to correct for wear. To finish the shoes for such drum, the abrasive wheel of our machine should be set at the corresponding radial figure, namely, 6.090 inches, from the axis of swing 5; that is, the setting as for a true 12-inch drum should be increased by one-half the oversize diametral measurement of the drum, .090 of an inch in the assumed case. All that the operator need do is to set the slide pointer 103 at 12 on the main scale 105 and then turn the dial wheel 97 toward the left, Fig. 2, to bring the graduation "180" opposite the pointer 100. The setting of the wheel face is thereby actually increased but .090 of an inch, automatically positioning it exactly 6.090 inches from the axis 5, in accurate conformity to the 12.180-inch diameter of the drum. Thus any fractional-inch drum-sizes or variations above or below standard are readily taken care of by the micrometer dial 97, reading it directly in figures of the determined drum diameter. Fractions above .200 of an inch are set by giving the dial one or more additional turns as needed. In that connection the dial marks may carry one or more additional series of numbers as 210 to 390, etc.; see Fig. 4c. Also if desired, the dial scale 99 may be numbered to read from zero in the opposite direction around the wheel, for setting clearances or undersizes by measuring down from a given size, but in practice it is found preferable to make the setting additively, as say 11 inches plus .750 rather than as 12 inches minus .150.

Having now set the abrasive wheel to the correct radial distance from the swing axis 5 corresponding to the given drum diameter, the shoe is placed with its web flatwise on the holder plate 21, in approximately central position and its then vertical flange is abutted against the positioning stops 21b. The shoe is secured merely by turning down the nut 49 of the clamp 44. It will be understood that the holder head 20—21 has first been moved toward the front of the machine to any extent needed to admit the shoe, by turning the feed knob 29, either before or after setting the abrasive unit as above described. Obviously any convenient order may be followed in setting the abrasive wheel, adjusting the holder head, and inserting the shoe. At any time after clamping the shoe it may be accurately centered transversely of the machine, so as to bring its medial radius into accurate parallelism with the axis of the abrasive wheel when the carrier is in its central position, as shown in Figs. 2 and 4. This is readily done by manipulation of either of the centering knobs 11 of Figs. 1 to 9 or in the embodiment of Figs. 10 to 11 by rotating the main operating handle 16 about its longitudinal axis.

In the operation of finishing a shoe, the latter is swung to and fro across and in contact with the face of the rotating abrasive wheel, by manually moving the operating handle 16 back and forth from one side to the other. As the operation progresses the shoe is fed toward the wheel as needed to maintain contact with it, by turning the feed screw 29. The abrasive action is continued until the desired thickness of material has been removed, generally but a small fraction of an inch. The abrading, grinding, burnishing or finishing is complete when it is noted that the shoe lining barely contacts or just clears the abrasive disk 50 uniformly throughout an entire swing from end to end, no more material being removed. The entire area of the lined face of the shoe then lies upon a true arc centered at the fixed axis 5 of the carrier assembly, corresponding to the center of the brake drum.

The ends of the lining may then be skived, as previously explained, by bringing them successively opposite the working area of the wheel and manually depressing one or the other of the chamfering levers 94, 95. If preferred this chamfering may be done before the intermediate body portion of the shoe is finished.

It will be noted as an important feature of our invention that once the machine has been set for the given drum size, there is no subsequent variation in the position of the axis about which the shoe is swung across the working face of the rotating disk. This remains true irrespective of any infeeding of the shoe. And since this axis of swing is fixed, the carriage pivot 5 being non-variably positioned on the bed 1, there is no way for this controlling point to be disturbed either in setting up the machine for a given job or in performing the work. The important determination of the distance of the face of the abrading element from the axis on which the shoe swings is made wholly independently of the work carrier and of any particular setting of any of its parts. As a further result the entire structure of the carrier is simplified and so can be made more rugged than otherwise. This construction and arrangement contrasts with one in which the pivot about which the work is to be swung is itself adjustable. There the swinging of the work and its holding mechanism in the course of a job tends to throw the main pivot out of accurate setting. Any such tendency is avoided in accordance with our invention, together with the numerous other advantages noted, through the medium of permanently fixing the work-swinging axis and adjustably moving the abrasive unit toward or from it, independently of the work carriage and any other parts.

Among further advantages of the illustrated construction we note that our holder head, comprising the main parts 20 and 21, is supported on a longitudinally immovable base portion or element 6, 7 of the carriage assembly. Hence its feeding movement is accurately controllable with more certainty than if this head were mounted on an element which in turn must be slidable in the same longitudinal direction. Such longitudinally immovable construction for the base portion of the carriage is possible because there is no mechanical operating connection between our carriage and the swing-radius setting means, the abrasive unit itself being shifted for the radius-setting purposes rather than any part of the carriage. For similar reasons no special provisions are needed for locking the shoe-holder head 20, 21 or its underlying parts, and hence there is no bothersome loosening and retightening of any such locking or clamping device before and after a feeding adjustment of said head. Also importantly contributing to the improved operating results is the fact that the longitudinally feedable holder head is above the fixed axial element 5 and structurally separate from it, so that the horizontal plane of contact of the holder head with the surface on which it is longitudinally adjustable, namely the top face of the upper base member 7, is different from and vertically spaced above the horizontal planular surface over which the work-swinging movement of the carrier as a whole takes place, namely the top face of the front table portion 2 of the machine bed itself. It is also notable that the center and axis 9 for the lateral centering adjustment of the shoe is separate from and wholly independent of the fixed axial member 5 for the shoe-swinging movement, so that in making such lateral adjustment there is no likelihood of disturbing the relation between said swing axis and the abrasive disk 50.

Referring again to the shoe end skiving means, the resulting bevel by a given throw of the chamfering levers 94, 95 may be adjusted in depth to suit the particular lining material, type of brake or other circumstance. As seen in Figs. 3 and 5, the nut 85 engaged by the cam fingers 86 to effect the quick forward chamfering movement of the abrasive unit may be shifted on the screw shaft 65 toward or from the normal position of the cam fingers illustrated. A correspondingly greater or less advance of the abrasive unit results, for the same given angular movement of the finger-carrying rock shaft 89. The throw of the chamfering levers, if desired, may be adjustably or variably limited by any suitable means, not necessary to show in the drawings.

The mechanism for setting the abrasive unit, already described, has as an important feature the capacity to incorporate a constant plus or minus factor in the setting of the micrometer dial 97, to compensate for any particular condition requiring correction, such for example as wear of the working face of the abrasive disk 50. When so employed the zero reading of the micrometer scale 99, instead of indicating a position of the grinder actually at say 6 inches from the axis 5 gives a radius setting of perhaps 6.040 or 5.960 inches. To take a specific instance; it is found that the face of the abrasive disk 50 has been worn to the depth of 0.050 of an inch, so that it is that much further from the carriage axis 5 than previously, at any particular intended setting. To correct for this a constant minus factor of 0.050 is needed; that is, the zero position of the scale 99 is made to give what previously was a setting of +.050, in other words, the abrasive unit slide is advanced 0.050 of an inch and the face of the rotary disk 50 is restored, at a zero setting of the dial scale, to the plane it occupied before wear occurred.

It will be recalled that in the illustrated example the screw shaft 65 has a lead of 0.1 of an inch. Hence the correction of 0.050 of an inch in the assumed instance involves a distance corresponding to one-half turn of the shaft, in this case in the direction to advance the grinder slide. This grinder unit zero position adjustment, in the construction here shown by way of example, is made without disturbing the fixed position of the dial wheel 97 on and relative to the screw shaft 65. As best seen in Fig. 3, at its lower right corner portion, and also in Fig. 1, said dial wheel 97 is held fast on its shaft as by a pin 97a. By use of the parts 76 to 84 at the rear of said shaft we avoid having to loosen and reset said dial wheel in connection with such adjustment. And since the dial wheel and its shaft keep their same angular relation substantially as a one-piece unit, no mechanical error as between said parts is possible, and we eliminate damage to and wear between them such as would likely result from loosening and resetting of the wheel on the shaft end by manipulation of a set screw or the like.

Returning to the above example in which we assume that a minus factor of 0.050 of an inch is desired, and referring now particularly to Figs. 1 and 3, the lock nut 84 on the rear end 81a of the threaded portion 81 of the hanger or bearing block 80 is loosened. Said block as a whole, including its threaded stem portions 81—81a, is then turned relative to its supporting collar 82—83 in a clockwise direction facing the rear of the machine, that is, as looking from the left in Fig. 3. Said hanger block thus is moved bodily forward, toward the right in said figure. Since it abuts the end of the screw shaft 65, the latter and the entire grinder slide assembly are correspondingly advanced. Graduation markings indicating the extent of such longitudinal adjustment of the grinder slide assembly per given degree of turn of the block 80 may be provided, if desired, at any convenient adjacent location. The thread on the stem 81 of the block is selected to give the fine increments of adjustment desired and may be the same as for the screw shaft, or otherwise.

It will be noted that in this adjustment the screw shaft 65 itself is not turned in the leg 64 of the grinder slide, but is bodily advanced axially, carrying the grinder unit as a whole with it. The face of the abrasive wheel 50 accordingly assumes its desired corrected position, and the zero position of the dial remains unchanged relative to the index pointer 100. Obviously the corrective factor thus introduced need not correspond to any particular fraction or multiple of the dial scale 99, being applied entirely independently of the latter, in the manner described.

Axial movement of the shaft 65 as well as rotation thereof is facilitated by its previously described bearings 74, 79, with avoidance of excessive wear, it being understood that the compression return spring 75 surrounding the shaft 65 exerts substantial pressure, adequate to insure positive return of the grinder unit to normal rearward position, after a chamfering operation, and yieldably but firmly to hold it at its particular setting during a grinding operation. This return movement is limited and the parts properly repositioned, as previously explained, by return engagement of the rear end of the shaft 65 and its abutment element 78 with the adjustable positioning and bearing block 80. The provision of such adjustable member 80, it will be seen, permits of corrective adjustment in the positioning of the abrasive unit slide assembly in the manner described, whether the need therefor is due to wear at the face of the abrading wheel or is otherwise occasioned.

In connection with any such adjustment the abutment nut 85 engaged by the cam fingers 86 of the chamfering mechanism may be correspondingly reset on the screw shaft 65 so that the depth of bevel given the shoe ends will be the same as before, said adjustment, for the same given movement of the chamfering levers 90, 91.

At an earlier point in the specification we have pointed out that the shoes are novelly presented to the grinder disk in such manner that the area of abrading action is centered upon a 45° radius of the disk, the medial radius of the lower left quadrant in the illustrated embodiment. The purpose and resulting advantages in this connection will be more readily understood from the diagrammatic views, Figs. 12, 13 and 14.

Referring to said diagrams, Fig. 12 represents the construction and arrangement of our invention as in the illustrated machine. A major portion of the abrasive disk 50 is shown, its axial center being indicated at C—54, the numeral referring to the shaft 54 of the grinder motor. The horizontal and vertical diameter lines of the disk are shown by the broken lines $h$—$h$ and $v$—$v$. The outer convex face of a shoe positioned in the machine is indicated by the wide dash-line rectangle marked S. The work carriage is assumed to be midway in its swing, so that its central vertical area or band is at the moment in abrasive contact with the disk 50. This contact band is represented by the smaller central dotted-line hatched rectangle Z.

The medial or 45° radius of the lower left quadrant of the grinder disk 50 is indicated by the heavier radial line marked 45°. As previously described, the construction of the swinging carriage and the work holder, and also that of the abrasive unit and the machine bed in its entirety, is made such that the areal center CP of the abrasive contact band Z of the shoe S stands opposite said 45° radius, at a point along the latter desirably at least approximately midway from the disk axis C—54 toward the outer edge of the disk.

Referring still to Fig. 12, there are also shown those radii which pass through the points or corners of the contact band Z that are the farthest spaced in the direction circumferentially of the disk. These radii determine a central angle $e$.

Said Fig. 12 further includes a series of four concentric arcs, each described about the disk center C—54. These arcuate lines represent the paths described by the abrasive particles of the wheel 50 at the several radial distances from the disk axis indicated. It will be noted that the outermost and the innermost of the four arcs pass through those points or corners of the band Z which are the most remote from and the nearest to the disk center, respectively. They define between them an arcuate path or zone R, of a width represented by the longer double-headed arrow. The intermediate pair of arcs represent the paths of the abrasive particles which cross the indicated 45° radius at the average distance (half-way) between the areal center point CP of the band Z and the respective outer and inner borders of the total zone R. These intermediate arcs define between them an arcuate path or zone RA, of the width corresponding to the shorter double-headed arrow. Said narrower zone RA accordingly represents the average or central work-productive half-width of the total abrasive zone R. In other words, zone R comprehends every point and particle on the face of the disk 50 which has any contact whatsoever with the shoe, regardless of the extent of that contact; and sub-zone RA of zone R is what we shall term the "major effective zone" of abrasive contact of the shoe and wheel. As stated, its arcuate sides are determined by measuring from the areal center CP along the central radius—the 45° radius in Fig. 12—one-half the distance toward each of the vertical sides of the contact band Z, at the opposite sides respectively of said areal center CP.

That portion of the total contact band Z which is crossed by said major effective zone RA is stipled and separately designated as ZA. This stipled area will be termed the "major effective contact area."

In each of Figs. 13 and 14 the same elements, angles, radii and zones are drawn, in connection with the same contact band Z upon the shoe S, the corresponding features having the same reference characters as in Fig. 12. Said Figs. 13 and 14 are included for the purpose of contrast with the Fig. 12 construction of our invention, wherein the contact band Z is centered upon the 45° radius. Fig. 13 shows the band Z, of precisely the same vertical and horizontal dimensions upon the same shoe S as in Fig. 12, but with the shoe and grinder disk 50 relatively positioned to locate the areal center CP of band Z centrally upon the horizontal diameter line $h$—$h$ of the disk. The same applies also to Fig. 14, wherein the areal center CP of the same band Z is centrally disposed upon the vertical diameter line $v$—$v$ of the disk 50.

From an inspection of Fig. 12 and a comparison thereof with each of Figs. 13 and 14 it will be apparent that in accordance with our construction as diagrammed in Fig. 12 the efficiency and economy of the abrading action are materially augmented, among other new and beneficial results to be referred to. In general, any favorable factors of the horizontal positioning of Fig. 13 and of the vertical positioning of Fig. 14 are all combined and availed of compositely, with a total result largely superior to that obtainable from either of the Fig. 13 or Fig. 14 arrangements.

Let us consider for example the comparative radial extents or widths of the total abrasive zones R in the three diagrams. It is immediately obvious that our Fig. 12 construction provides a total abrasive zone R of the greatest width, noting particularly the length of the double-headed arrow R near the top of each diagram. The vertical construction of Fig. 14 is second in this respect, and the horizontal construction of Fig. 13 is the most unfavorable, its double-headed arrow R being considerably the shortest. The significance of this is that in our construction the work of grinding a given area at the face of a shoe is distributed over an importantly greater area of the abrasive disk, so that more of the abrading material of the disk is availed of in the given job, and any one zone or any one particle at the wheel face is called on to do less work for the same resulting grind. The life of the abrading disk accordingly is extended proportionately.

Now let us compare the figures with respect to their several major effective contact areas ZA. The benefits here, with our Fig. 12 construction, are perhaps of even greater importance than those just noted in connection with the total abrasive zones R. This area ZA, represented by the stipled portion in each of the diagrams, may perhaps best be understood as that area over which the grinding is performed at the average lineal speed, that is, the average of all the lineal speeds of all the particles which take part in the grinding action to any extent whatsoever, including the slowest lineally moving particle, namely the one nearest the disk center C—54, and also the most rapidly lineally moving particle, namely the one most remote from the disk center C—54. The abrasive wheel 50 is assumed to have the same rotary speed in each of the diagrams. This stipled area ZA may otherwise be termed the area of average uniform lineal speed of grind.

It is an accepted fact that a more uniform and otherwise better grinding action results where all of a surface to be ground is acted upon at the same lineal speed over the entire contacted part of the abrading element. For this reason the flat face of a wheel is not considered to be appropriate to some types of abrading work. But in accordance with our invention face grinding is adapted to the finishing of brake shoes with superior results over those heretofore obtained in such manner, because a substantially greater portion of the total grinding effort is brought within the major effective area or average uniform speed of grind area ZA.

Said average effective area ZA of our Fig. 12 construction is almost twice that of Fig. 13 or of Fig. 14, as is clear from mere inspection of the diagrams.

In the horizontal type of Fig. 13 the maximum lineal speed variation in the abrading contact, between the inner and outer arcuate edges of the area ZA, is the least, as indicated by the relatively short arrow RA in said figure. Such total speed variation is somewhat more in the vertical type of Fig. 14, as indicated by its arrow RA. In our Fig. 12 construction it is substantially the same as for Fig. 14, the arrows RA of Fig. 12 and of Fig. 14 being about of a length. But this maximum lineal speed variation within the confines of the major effective areas ZA is not greatly different in any one of the three instances. The three arrows RA have a length relation in the ratio of about 18, 17 and 12 for Figs. 12, 14 and 13 respectively. Hence obviously there is no substantial disadvantage in the Fig. 12 construction in this respect of total speed variation, certainly nothing to neutralize to any practical extent its great advantage in the approximate doubling of the total areal extent of its average effective area ZA. This major advantage indeed results largely from this very fact that in our case the radial width of the average lineal speed area ZA, in other words the width of the major effective zone RA, just considered, as indicated by the arrows RA, is almost as great as in Fig. 14 and is more than in Fig. 13, in the 17, 18, 12 proportion noted. For while the minor dimension or RA distance of the ZA area in our case is thus equal to or greater than that of the others, its major dimension, in the direction circumferentially of the wheel 50, is nearly equal to that of Fig. 13 (compare the arcuate arrows in the ZA areas), and is substantially greater than that of Fig. 14. This excess of circumferential length of the ZA area in Fig. 12 over that of Fig. 14 is more than twice the shortage in that respect as between Fig. 12 and Fig. 13, in the ratio of about 9 to 4. In brief, our major effective contact or average speed area ZA is both long and wide and hence more extensive than one of about equal length but narrow (Fig. 13) or of about equal width but short (Fig. 14).

Another feature of advantage in our 45° construction of Fig. 12 concerns the size of the central angles e and the position and extent of the respective ZA areas relative to the subtended sectors. Said angles, in Figs. 12, 13 and 14 respectively, are 35°+, 39° and 28°. Thus the angle e of Fig. 12 is about of a size with that of Fig. 13, and is one-fourth again larger than that of Fig. 14. As previously stated, these angles are determined by radii drawn through those points of the total contact bands Z which are the farthest spaced circumferentially.

In Fig. 12 said determining points are well within the stipled ZA area, in the radial direction, while in both Figs. 13 and 14 they are wholly without said ZA area, toward the disk center C—54, substantially more so in Fig. 14 than in Fig. 13. Hence in our construction of Fig. 12 a larger area of the subtended sector of the abrasive wheel is active at a given moment; further, the longest arc of such active sector portion is substantially central of our ZA zone. Thus the average-speed active area is not only larger but also is more symmetrically disposed and balanced. And since in our case the average speed or uniform action area ZA covers a greater proportion of the total contact band area Z, being actually almost twice greater in proportion than in the other constructions, it follows that a given job may be satisfactorily completed in less time and with less wear of the abrasive element.

Otherwise stated, the proportion of the total contact band Z outside the uniformity area ZA is materially less in our construction than in the others, as is seen by comparing the extent of the hatched but non-stipled areas of the three diagrams. And it is important than in our case said clear-hatched portions of the Z band rapidly decrease in extent as they approach the two opposite extremes of lineal speed-of-grind variation, that is, as they approach the inner and the outer arcuate confines of the total abrasive zone R. In other words, the major part of these substantially triangular clear-shaded Z portions of Fig. 12 are adjacent the uniformity zone ZA. But in contrast with this, both in the Fig. 13 and the Fig. 14 constructions, substantially the reverse is true, and the relatively large sections of the Z bands lying outside the ZA area, as represented by the hatched but unstipled sections, are of their maximum circumferential extent substantially or fully to the inner and outer limits of the total abrasive zone R.

Thus Figs. 12 to 14 clearly indicate diagrammatically that with our novel construction a relatively inconsiderable part of the total grinding effort is carried out at either of the extremes of the different lineal speeds, that is, either in the region nearest the wheel center C—54 or in that most remote from it. In a word, our invention affords a materially greater uniformity in the lineal speed of abrasive contact over substantially more of the total contact area upon the face of the abrading wheel.

Further, with the machine and method of our invention the dust or waste particles of material from the abrading element and the shoe lining are carried off most effectively. There is little or no residue in the wheel housing, and very little dust escapes to clog and wear the machine or to disturb the operator or accumulate on adjacent objects.

This apparently is due to those aspects of the improved grinding action above considered and also to the fact that in our invention the dominant direction of movement of the shoe-contacting part of the wheel is neither directly downward as in Fig. 13 nor directly horizontal as in Fig. 14. With the 45° positioning utilized in our machine the major directive effect upon the dust is an average of or half-way between the vertical and the horizontal. By reason of this and the various other factors involved the dust particles are swept out through the lateral outlet 60, previously described, with a minimum distortion of or obstruction to their natural path of travel, said outlet having its axis at approximately a 45° angle to the wheel radius central of the work, and accordingly in the example shown being substantially horizontal. The efficiency of this action is such that no supplemental suction or blowing effort is needed, even in the absence of vanes at the rear face of the abrading wheel, although such may be provided if desired, as indicated for example at 52a in Fig. 4d. Said dust outlet 60 is in closed communication with a dust receptacle disposed at any convenient location.

The terms "abrading" and "grinding" are herein employed generically and will be understood as inclusive of cutting, burnishing, polishing or other finishing action upon lined arcuate brake shoes and the like for automotive and similar purposes.

Our invention either as to method or means is not limited to the steps or structure as herein described or illustrated by way of example, its scope being pointed out in our following claims.

We claim:

1. In a brake shoe finisher, a bed, a longitudinal guideway at the rear portion of the bed, a motor-driven rotary abrasive unit including a base mounted on the bed for movement along said way, an adjusting screw shaft carried by the bed and having threaded engagement with the abrasive unit base for advancing or retracting said unit, the bed having a horizontal wall along said guideway and the abrasive unit base having a portion extending down through the guideway and below said wall, a plurality of rollers on a transverse shaft in the bed and adapted to engage the underface of said wall, at least one roller member at each side of the guideway, means on the downwardly extending base portion positioning the roller shaft lengthwise of the bed, and spring means between said shaft and the abrasive unit bed acting to urge the shaft and rollers upwardly and the abrasive unit downwardly into firmly seated position on the bed.

2. A brake shoe finisher comprising a bed, a shoe carrier assembly mounted to swing about a fixed vertical axis at the front portion of the bed, a motor-driven abrasive unit mounted to have adjusting movement on and lengthwise of the bed, the latter including upright front and rear walls and connecting side walls defining a chamber, the abrasive unit having a depending portion in said chamber, an adjusting screw shaft in the said chamber and having threaded connection with the depending portion of the abrasive unit, bearing means on the bed front wall rotatably supporting the shaft with capacity for bodily axial movement thereof, a hand operating member and scale and index means at the front end of the shaft outside the bed, the shaft ending short of the rear wall of the bed, a sleeve threaded through said rear wall in line with the shaft, and a block having a threaded rear portion extending through said said sleeve and of a length permitting the block to be rotatably adjusted variably to position it lengthwise the bed, said block adapted to have abutting and supporting engagement with the rear end of the shaft, adjustment of the block serving to vary correctively the position of the abrasive unit corresponding to a given reading of the shaft dial.

3. In a brake shoe finisher, a bed, a longitudinal guideway at the rear portion of the bed, a motor-driven rotary abrasive unit including a base mounted on the bed for movement along said way, an adjusting screw shaft carried by the bed and having threaded engagement with the abrasive unit base for advancing or retracting said unit, means on the bed supporting the shaft for rotation and also bodily shifting movement axially, spring means normally urging the shaft and abrasive unit rearwardly into the given position of adjustment as determined by rotation of the shaft, an abutment on the shaft, a cross shaft journalled in the side walls of the bed behind said abutment and having at least one end projecting laterally outside the bed, a cam device fixed on the cross shaft and engageable with the shaft abutment so as to move the screwshaft and abrasive unit bodily forward for skiving the ends of a brake shoe lining, and an operating lever fixed on said cross shaft and extending forwardly to a position convenient to the operator, the cam device and said lever being constructed and proportioned to afford a substantial leverage whereby said skiving operation is readily manually controllable at the will of the operator.

4. In a machine of the class and for the purpose described, a bed, a shoe carrier assembly mounted to swing about a vertical pivot on the bed, and an abrasive wheel on the bed rotatable in a vertical plane transverse of the bed, said carrier assembly including a holder element for presenting the shoes to the abrasive wheel for swinging across its operative face in abrading relation to it, said holder element having an inwardly projecting shoe-receiving portion having means thereon for supporting engagement with the under face of a shoe web and also having relatively fixed inner end abutments for positioning abutment against the inner face of the arcuate flange of the shoe solely at points spaced laterally to either side of the central radius of the shoe, said abutments being shaped and arranged for conforming abutment with all diameters of shoes within the range of the machine, said holder element thereby adapted for universal mounting of different sizes of shoes within the capacity of the given machine.

5. In a machine of the class and for the purpose described, a bed, a shoe carrier assembly mounted to swing about a vertical pivot on the bed, and an abrasive wheel on the bed rotatable in a vertical plane transverse of the bed, said carrier assembly including a holder element for presenting the shoes to the abrasive wheel for swinging across its operative face in abrading relation to it, means on the holder element for positioning a shoe in the direction axially of the abrasive wheel and for supporting it solely by its web and with the latter substantially horizontal, an upright post on the holder element, and a unitary clamping member apertured for positioning reception on said post, said clamping member having angularly disposed forward portions adapted for clamping engagement downwardly upon the upper face of the shoe web, said clamping member also having a bifurcated rear portion with down-turned outer end members adapted to engage separably upon a top face portion of the holder element, spring means urging the clamping member upwardly, and an adjusting hand member threaded on said post and engageable with the clamping member for moving the latter down into shoe-securing position.

6. In a machine of the class and for the purpose described, a bed, a shoe carrier assembly mounted to swing about a vertical pivot on the bed, and an abrasive wheel on the bed rotatable in a vertical plane transverse of the bed, said carrier assembly including a holder element for presenting the shoes to the abrasive wheel for swinging across its operative face in abrading relation to it, said holder element having an inwardly projecting shoe-receiving portion having means thereon for supporting engagement with the under face of a shoe web, and associated means for positioning abutment with the inner vertical face of the arcuate flange of said shoe, said latter means adapted to engage said flange only at circumferentially spaced portions thereof below the shoe web and being spaced both from the flange and the web in the immediate region of the juncture of said shoe parts thereby to avoid improper shoe positioning due to excess material of the shoe at said juncture region.

7. In a brake shoe finisher, a bed, a vertical pivot element constantly fixed in predetermined stationary position on a front part of the bed, a carrier base mounted on the bed for swinging about said pivot element, a carrier head slidable on said base radially of the pivot element of the latter, and adjustable shoe-supporting and clamping means on the carrier head for presenting any of the variously dimensioned shoes with their lined flanges upright in position for abrasive finishing, said supporting and clamping means comprising a horizontal plate for seating the shoe web and having flatwise engagement solely with the under face of the web and so that the upright lined shoe flange extends above and below said plate at the edge portion of the latter opposite the pivot, and said edge portion of the plate having laterally spaced positioning abutments immovably fixed relative to the plate but shaped and disposed to be universally engageable with the under-web inner arcuate flange face of any of the variously dimensioned brake-shoes to be finished.

8. In a brake shoe finisher, a bed, a longitudinal guideway at the rear portion of the bed, a motor-driven rotary abrasive unit mounted for movement along said way, means carried by the bed for advancing or retracting said unit, said means including a screw shaft supported for rotation and also bodily shifting movement axially, spring means normally urging the shaft and abrasive unit into a given position of adjustment as determined by rotation of the shaft, an abutment on the shaft, a cross shaft journalled in the side walls of the bed behind said abutment and having at least one end projecting laterally outside the bed, and a cam device fixed on the cross shaft and engageable with the shaft abutment for moving the screw shaft and abrasive unit bodily, to skive the ends of a brake shoe lining, at the will of the operator.

9. In a brake-shoe finisher, a longitudinal bed, a work-carrier pivoted on the bed upon an axis fixed in constant stationary non-variable position with respect to the bed, a guideway on a portion of the bed spaced lengthwise from said constant work-carrier axis and extending in the direction toward the latter, a motor-driven rotary abrasive unit mounted for movement along said way, means carried by the bed for advancing or retracting said unit, said means including a screw shaft supported for rotation and also bodily shifting movement axially, spring means normally urging the shaft and abrasive unit into a given position of adjustment relative to said constant work-carrier axis as determined by rotation of the shaft, and manually operable means bodily to move the screw shaft and abrasive unit relatively to the work-carriage constant axis and toward the brake shoe lining for end skiving purposes.

10. In a finishing machine for lined arcuate brake-shoes, in combination, a stationary bed, a work-carrier mounted thereon to swing about a vertical axis constantly and invariably fixed immovably relative to the bed, said work-carrier comprising brake-shoe positioning and holding means including a shoe-web receiving plate and a hold-down device for substantially horizontal flatwise receiving and clamping engagement solely with the respective opposite faces of the shoe-web, said web-receiving plate having fixed portions at its inner end for endwise-abutting shoe-positioning contact solely with circumferentially spaced points at the inner concave face of the lined shoe flange, an abrasive wheel and motor unit movably mounted on the machine bed at a portion thereof spaced lengthwise from said constant position of the work-carrier axis, and mechanism for incrementally moving said unit relative to the work-carrier axis thereby predeterminedly to set the radius of abrasive finishing for the given brake-shoe as presented by said positioning and holding means.

11. In a brake-shoe finisher, a bed, a brake-shoe carrier assembly comprising lower and upper base plates, the lower base plate having permanent immovably fixed pivotal connection with the bed for swinging about a vertical axis, the upper base plate being of generally similar horizontal extent as the lower one and being supported directly on and by the lower one with capacity for turning on and relative to the latter thereby laterally to adjust the brake-shoe position, vertical pivot means intermediate said plates and horizontally spaced from said immovably fixed vertical axis of the lower base plate, for defining the axis of said turning of the upper base plate, and manual means for effecting said laterally-adjusting turning of the upper base plate.

12. In a brake-shoe finisher according to claim 11, a web-receiving holder plate for the brake-shoe, said holder plate including means to position the brake-shoe with its web substantially horizontal and its lined face upright, means on the upper base plate for supporting and guiding the holder plate for vertical tilting movement to variable extents about a horizontal axis substantially paralleling the major chord of the brake-shoe, and means for so moving the holder plate and to retain it in selected adjusted position relative to the upper base plate.

13. In a brake-shoe finisher, a bed, a brake-shoe carrier assembly comprising lower and upper base plates, the lower base plate having permanent immovably fixed pivotal connection with the bed for swinging about a vertical axis, the upper base plate being of generally similar horizontal extent as the lower one and being supported directly on and by the lower one with capacity for turning on and relative to the latter thereby laterally to adjust the brake-shoe position, vertical pivot means intermediate said plates and horizontally spaced from said immovably fixed vertical axis of the lower base plate, for defining the axis of said turning of the upper base plate, manual means for effecting said laterally-adjusting turning of the upper base plate, said carrier assembly having a projecting hand grip for swinging it about its axis, said hand grip having also a bodily rotative movement relative to the carrier assembly and having connections with said manual means whereby said rotative movement of the hand grip effects the laterally-adjusting turning of the upper base plate.

14. A grinder for lined arcuate brake-shoes of various degrees of curvature, comprising, in combination: a stationary longitudinal bed; a work-carrier assembly mounted to swing about a vertical pivot at one longitudinal portion of the bed, said assembly including a horizontal plate element extending radially of the carrier-assembly pivot and adapted to support a shoe in a given horizontal plane by seating engagement with an under horizontal surface thereof, an overlying vertically movable clamp element for securing engagement with an upper horizontal surface of the shoe, and laterally spaced shoe-locating abutments on one of said elements for centering engagement with the vertical inner arcuate face of the shoe flange at circumferentially spaced locations thereon; a rotary abrading unit including a wheel with a radial abrasive face and a motor to drive it, said abrading unit mounted on another longitudinal portion of the bed for adjusting movement toward and from the work-carrier assembly pivot thereby accurately to determine the radius of grind for the shoe; means for so adjustively moving the abrading unit; and said carrier-assembly pivot and the wheel axis being offset in mutually perpendicular planes and being so positioned relative to each other and to the shoe supporting and locating elements of the carrier-assembly that the zone of abrading contact between the wheel and shoe is substantially centered both vertically and horizontally upon a 45° radius of the wheel face and at approximately midlength of said radius.

IRVING B. JOHNSON.
ANTHONY ARQUILLA.